United States Patent
Rezai et al.

(10) Patent No.: US 10,611,930 B2
(45) Date of Patent: Apr. 7, 2020

(54) CONDUCTIVE BONDED COMPOSITES

(71) Applicant: BAE SYSTEMS plc, London (GB)

(72) Inventors: Amir Rezai, Bristol (GB); Alexander Roy Parfitt, Bristol (GB); Brett Edward Hemingway, Blackburn (GB)

(73) Assignee: BAE Systems PLC, London (GB)

( * ) Notice: Subject to any disclaimer, the term of this patent is extended or adjusted under 35 U.S.C. 154(b) by 1108 days.

(21) Appl. No.: 14/763,194

(22) PCT Filed: Jan. 16, 2014

(86) PCT No.: PCT/GB2014/050126
§ 371 (c)(1),
(2) Date: Jul. 24, 2015

(87) PCT Pub. No.: WO2014/114915
PCT Pub. Date: Jul. 31, 2014

(65) Prior Publication Data
US 2015/0361308 A1  Dec. 17, 2015

(30) Foreign Application Priority Data
Jan. 24, 2013  (GB) .................................. 1301274.5

(51) Int. Cl.
*C09J 9/02*  (2006.01)
*B32B 5/26*  (2006.01)
(Continued)

(52) U.S. Cl.
CPC ............... *C09J 9/02* (2013.01); *B29C 65/483* (2013.01); *B29C 65/488* (2013.01);
(Continued)

(58) Field of Classification Search
None
See application file for complete search history.

(56) References Cited

U.S. PATENT DOCUMENTS

| | | |
|---|---|---|
| 4,556,591 A | 12/1985 | Bannink, Jr. |
| 5,461,534 A | 10/1995 | Gondot et al. |
| | (Continued) | |

FOREIGN PATENT DOCUMENTS

| | | |
|---|---|---|
| WO | 9951494 A1 | 10/1999 |
| WO | 2007006633 A1 | 1/2007 |
| | (Continued) | |

OTHER PUBLICATIONS

International Preliminary Report on Patentability received for Patent Application No. PCT/GB2014/050126, dated Aug. 6, 2015. 6 pages.
(Continued)

*Primary Examiner* — Shawn Mckinnon
(74) *Attorney, Agent, or Firm* — Finch & Maloney PLLC

(57) ABSTRACT

The invention relates to methods of bonding and a conductively bonded joint, provided by high loadings of conductively coated nano scale particulate fillers in a conductive adhesive in combination with a conductive intermediary structure, more particularly to a lightning strike resilient bonded joint between fibre reinforced polymer composites. A method of joining a first fibre reinforced polymer composite surface and a second fibre reinforced polymer composite surface, comprising the steps of
providing a conductive intermediary structure between said first and second surfaces,
filling the void between said surfaces and enveloping said intermediary structure with a conductive adhesive,
curing the conductive adhesive to form a bonded first and second surface.
A conductive adhesive comprising a curable binder and a high aspect ratio nanoscale carbon particulate filler present in the range of from 0.1 to 40% wt, wherein said particulate filler comprises a metal coating.

12 Claims, 1 Drawing Sheet

Figure 1:
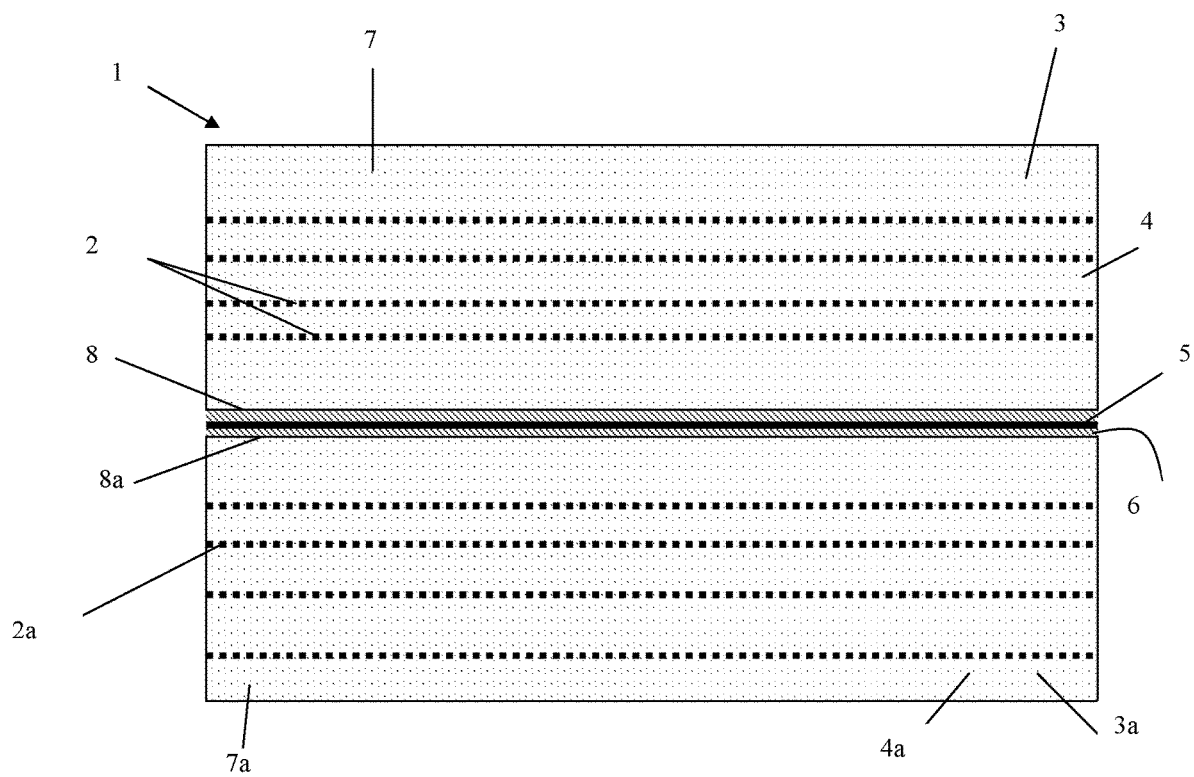

(51) Int. Cl.

| | | |
|---|---|---|
| *B32B 27/20* | (2006.01) | |
| *C08K 3/04* | (2006.01) | |
| *B32B 27/38* | (2006.01) | |
| *B32B 37/12* | (2006.01) | |
| *B64D 45/02* | (2006.01) | |
| *C09J 163/00* | (2006.01) | |
| *B32B 5/02* | (2006.01) | |
| *B32B 27/12* | (2006.01) | |
| *B29C 65/48* | (2006.01) | |
| *B29C 65/00* | (2006.01) | |
| *B29C 65/56* | (2006.01) | |
| *C09J 11/04* | (2006.01) | |
| *C09J 5/06* | (2006.01) | |
| *B32B 7/12* | (2006.01) | |
| *B32B 27/40* | (2006.01) | |
| *B32B 27/36* | (2006.01) | |
| *B32B 27/28* | (2006.01) | |
| *B32B 27/30* | (2006.01) | |
| *B29K 105/16* | (2006.01) | |
| *B29L 31/30* | (2006.01) | |
| *B29C 65/14* | (2006.01) | |
| *B29K 305/00* | (2006.01) | |
| *B29C 65/50* | (2006.01) | |
| *B29K 705/00* | (2006.01) | |
| *B29K 105/20* | (2006.01) | |
| *B29K 105/12* | (2006.01) | |
| *C08K 9/02* | (2006.01) | |

(52) U.S. Cl.
CPC ...... *B29C 65/4855* (2013.01); *B29C 65/4885* (2013.01); *B29C 65/564* (2013.01); *B29C 66/1122* (2013.01); *B29C 66/721* (2013.01); *B32B 5/024* (2013.01); *B32B 5/26* (2013.01); *B32B 7/12* (2013.01); *B32B 27/12* (2013.01); *B32B 27/20* (2013.01); *B32B 27/281* (2013.01); *B32B 27/306* (2013.01); *B32B 27/36* (2013.01); *B32B 27/38* (2013.01); *B32B 27/40* (2013.01); *B32B 37/1207* (2013.01); *B32B 37/1284* (2013.01); *B64D 45/02* (2013.01); *C08K 3/041* (2017.05); *C09J 5/06* (2013.01); *C09J 11/04* (2013.01); *C09J 163/00* (2013.01); *B29C 65/1406* (2013.01); *B29C 65/1412* (2013.01); *B29C 65/4845* (2013.01); *B29C 65/5021* (2013.01); *B29C 66/7212* (2013.01); *B29C 66/72141* (2013.01); *B29C 66/72143* (2013.01); *B29K 2105/124* (2013.01); *B29K 2105/162* (2013.01); *B29K 2105/167* (2013.01); *B29K 2105/206* (2013.01); *B29K 2305/00* (2013.01); *B29K 2705/00* (2013.01); *B29K 2995/0005* (2013.01); *B29L 2031/30* (2013.01); *B29L 2031/3082* (2013.01); *B29L 2031/3085* (2013.01); *B32B 2037/1238* (2013.01); *B32B 2260/021* (2013.01); *B32B 2260/023* (2013.01); *B32B 2260/046* (2013.01); *B32B 2262/00* (2013.01); *B32B 2264/10* (2013.01); *B32B 2264/105* (2013.01); *B32B 2264/107* (2013.01); *B32B 2264/108* (2013.01); *B32B 2307/202* (2013.01); *B32B 2307/302* (2013.01); *B32B 2307/50* (2013.01); *B32B 2307/558* (2013.01); *B32B 2307/732* (2013.01); *C08K 3/04* (2013.01); *C08K 3/042* (2017.05); *C08K 9/02* (2013.01); *C08K 2201/016* (2013.01); *Y10S 977/742* (2013.01); *Y10T 442/10* (2015.04); *Y10T 442/3667* (2015.04)

(56) References Cited

U.S. PATENT DOCUMENTS

| | | | |
|---|---|---|---|
| 5,951,812 | A | 9/1999 | Gilchrist, Jr. |
| 5,958,550 | A * | 9/1999 | Childress ............... B29C 70/24 428/119 |
| 2008/0226876 | A1* | 9/2008 | Roth ................... B29C 70/086 428/172 |
| 2010/0276645 | A1* | 11/2010 | Aspin ...................... C09J 9/02 252/513 |
| 2012/0211144 | A1 | 8/2012 | Litzenberger et al. |

FOREIGN PATENT DOCUMENTS

| | | |
|---|---|---|
| WO | 2008146014 A2 | 12/2008 |
| WO | 2014114915 A1 | 7/2014 |

OTHER PUBLICATIONS

International Search Report and Written Opinion received for Patent Application No. PCT/GB2014/050126, dated Apr. 17, 2014. 15 pages.

GB Intellectual Property Office Search Report under Section 17(5) received for GB Patent Application No. 1301274.5 dated May 22, 2013. 5 pages.

Wu, et al., "Properties investigation on isotropical conductive adhesives filled with silver coated carbon nanotubes," Composites Science and Technology, vol. 67, No. 6. May 1, 2007. pp. 1182-1186.

* cited by examiner

CONDUCTIVE BONDED COMPOSITES

The invention relates to methods of bonding and a conductively bonded joint, provided by using high loadings of conductively coated nano scale particulate fillers in a conductive adhesive composition, in combination with a conductive intermediary structure, more particularly to a lightning strike resilient bonded joint formed between two fibre reinforced polymer composite structures.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

According to a first aspect of the invention there is provided a method of bonding a first fibre reinforced polymer composite surface and a second fibre reinforced polymer composite surface, comprising the steps of
providing a conductive intermediary structure between said first and second surfaces,
filling the void between said surfaces and enveloping said intermediary structure with a conductive adhesive,
curing the conductive adhesive to form a bonded first and second surface.

The conductive adhesive preferably has a conductive high aspect ratio nano scale particulate filler, preferably the particulate filler has a conductive coating.

The particulate filler may be selected from any commonly used particulate filler material, such as, for example, metals, metal alloys, metalloids, inorganic compounds, ceramics and nanoscale carbon particulates, such as, for example, carbon nanotubes, graphite, graphitic fillers, graphene nanoplatelets, more preferably a nanoscale particulate, yet more preferably a nanoscale carbon particulate, such as, for example carbon nanotubes or graphene platelets.

The conductive adhesive preferably comprises a curable binder and a high aspect ratio nanoscale carbon particulate filler in the range of from 0.1 to 40% wt, wherein said particulate filler comprises a metal coating, preferably the particulate filler is present in the range of from 1 to 15% wt.

The particulate filler may be present in amount greater than 0.1% wt, preferably 0.5% wt, preferably greater than 1% wt, more preferably greater than 5% wt, even more preferably greater that 10% wt, preferably in the range of from 10% wt to 40% wt. Preferably the average longest dimension of the filler particulate is less than 500 microns, more preferably less than 50 microns, yet more preferably sub micron, more preferably nanoscale particulates. In a highly preferred arrangement the particulate filler is selected from high aspect ratio particulate fillers, such as, for example carbon nanotubes, which may possess average longest dimension of less than 20 microns and typically have a diameter of less than 20 nanometers.

The conductive coating on the nanoscale particulate filler may be a conductive polymer or a metal, preferably a metal, such as, for example nickel, silver or copper. The metal may be present of the order of 1 to 50 atom thick layers of metal, upto 20 nm. The metal may be applied using known techniques such as sputtering, electroplating and organo-silver depositions.

Polymeric conductive coatings may be polyanaline and polypyrrole which may be applied via thin film techniques at a thickness of from monolayers up to 20 nm.

Typically the curable binder is a liquid resin, and may preferably be selected from epoxy resins, polyimides, unsaturated polyesters, vinyl esters, polyurethane, more preferably epoxy resins. The curable binder may dissolve in or react with the main resin matrix in the FRPC materials, during the infusion process.

At high inclusion weight percentages, such as for example greater than 10% wt of high aspect ratio particulate fillers provide enhanced physical and mechanical properties. The use of nanoscale carbon particulates as particulate fillers provides enhanced stiffness, strength, toughness, fatigue strength, properties, preventing the promulgation of cracks. Furthermore nanoscale carbon particulates when presented at greater than 10% wt may provide significant thermal conductive properties.

The conductive intermediary structure may be selected from at least one of a plurality of metallic/conductive spheres, plurality of conductive pins, metallic mesh, conductive fibre ply, and carbon nanotube film. The intermediary structure may preferably have a thickness which is substantially the same as the bonding gap ie the distance between the two surfaces to be bonded. Optimum bond-line thicknesses in structural joints range from 0.05 mm to 5 mm, more preferably 0.125 mm to 2 mm.

The metallic spheres may provide a dual purpose of controlling minimum bondline thickness and promoting conductivity. The spheres may be made of any conductive material, preferably metal or graphite, preferably they are solid, such that they may carry a higher energy density than a metal coated hollow sphere. The metals may be highly conductive metals such as for example silver, copper or nickel. The spheres are selected to be of a different dimensional size to the filler particulates, and may have a diameter in the range of from 1 micron to 2000 microns, such that the micron sized spheres and nanoscale particulate fillers dispersions will work in concert to enhance high current conductivity. The sphere diameter would therefore be selected to closely match the design bond-line thickness.

The intermediary structure may comprise a regular array of a plurality of substantially vertical pins/interconnections, Z-pins, I-pins, spanning the bond line. The pins may be formed in an integrated in a carrier framework for handling purposes. This will cover the entire joint surface, preferably but not extending to the edges-to prevent stress raisers. The pins do not need to be in electrical contact with the fibre plys in the first and or second polymer composite structures The intermediary structure may also be made from a fine metallic mesh or conductive fibre ply. The fibre ply may be any continuous fibre, a wound filament, woven fibre, chopped fibre or at least one ply sheet of material. The fibre reinforcement may be cut or formed into the shape of a component to be manufactured. The fibre reinforcement may be selected from any known fibre reinforcement material, such as, for example, carbon fibre, or a non conducting ply such as, for example glass fibre, aramid fibre(Kevlar®), polyethylene fibre (Dyneema®), boron fibre, and SiC fibre, which has a conductive coating thereon.

The intermediary structure may be a nano film, such as, for example an aggregated nano carbon structure such as buckypaper. The nano film may further be shaped so as to form an undulating or corrugated surface arrangement. Typically the nano film thickness may be of the order of 10-100 nm. The structuring into egg-crate or corrugated patterns may be achieved by press or pre-formed aided by a resin compatible binding agent. There may be aplurality of layers, such that the total thickness of the nanofilms, or their 3D structure is of the order of the bondline thickness.

The cure may be caused by a curing stimulus, which may be any chemical curing agent and/or irradiative means to cause a curing reaction, such as, for example chemical hardeners, UV, IR, electron beam and heat. Preferably a chemical hardener.

The methods defined herein promote conductivity as well as high current carrying capacity, which may be useful for lightning strike protection. One explanation is that highly concentrated and closely packed carbon nanoscale particulate networks in a dielectric binder matrix can maintain conductivity at high temperatures after the binder matrix has burnt off. The methods defined herein may enable a degree of tailoring to match the conductivity and energy density of the bond-line with that of its adjacent substrates. Further functionality such as structural health monitoring may be used in the bond line assembly to help achieve optimum bond-line thickness for strength and durability purposes.

According to a further aspect of the invention there is provided a method of mitigating the effects of a lightning strike on a bond line of a first fibre reinforced polymer composite surface and a second fibre reinforced polymer composite surface, comprising the steps of
providing a conductive intermediary structure between said first and second surfaces,
filling the void between said surfaces and enveloping said intermediary structure with a conductive adhesive,
curing the conductive adhesive to form a bonded first and second surface.

According to a further aspect of the invention there is provided a conductive adhesive comprising a curable binder and a high aspect ratio nanoscale carbon particulate filler present in the range of from 0.1 to 40% wt, wherein said particulate filler comprises a metal coating, preferably the particulate filler is present in the range of from 1 to 15% wt.

According to a further aspect of the invention there is provided a lightning strike resilient bonded composite structure comprising a first fibre reinforced polymer composite surface and a second fibre reinforced polymer composite surface, deposed therebetween at least one conductive intermediary structure and a cured conductive adhesive, preferably the conductive adhesive defined herein.

According to a yet further aspect of the invention there is provide a vehicle, vessel or craft, comprising at least two structural components, which are affixed by the method defined herein.

The conductive adhesive requires a high loading of a high aspect ratio conductive filler. The inclusion may be prepared by preparing a curable monomer adduct powder comprising providing a curable monomer, at least 0.1% wt of a nanoscale carbon particulate filler, wherein said particulate comprises a conductive coating, and at least one curing stimulus, comprising the steps of
a) forming a monomer admixture,
b) causing the partial cure of the monomer admixture to a partially cured adduct,
c) reducing the partially cured adduct to an curable monomer adduct powder.

The curable monomer adduct powder, may be used to create the conductive adhesive, the monomer adduct power may be dissolved in a further binder or solvent, or the monomer adduct powder may be used to fill the void, and reflowed and cured.

The process of mixing and dispersing conductive high aspect ratio particulate filler material, such as for example conductively coated carbon nanotubes (CNTs) within the curable monomer (i.e. a liquid resin) and then transforming said adduct to an curable monomer adduct powder, ensures that the dispersion of the particulate filler in the curable monomer adduct powder is homogeneous and fixed. Conversely, during conventional liquid resin processing the resin/particulate filler solution whilst it is stored in liquid form it is known that, under the action of van der Waals forces, the particles tend to re-agglomerate reducing the quality of dispersion.

The incorporation of the particulate filler material in the partially cured curable monomer adduct powder, ensures that the particulate filler may be evenly dispersed during the final cure, and hence evenly dispersed within the final adhesive, and any resultant bonded structure. There is significantly reduced, substantially no, migration of the particulate filler during the final cure.

The partial curing reaction is effectively stopped before 100% cross linking is achieved, preferably less than 90%, preferably less than 70%. The use of cryogenic milling has been shown to provide a 70% cured adduct, as confirmed by DSC measurements.

Prior to the final cure step in providing a FRP, there may be further additives, fillers, sensors, wires, reinforcement means that are added to the laminate to provide further functionality.

The curable monomer adduct powder may be applied to a surface by a powder coating process, the curable monomer adduct powder may then be cured to provide a coating.

Figure 2:
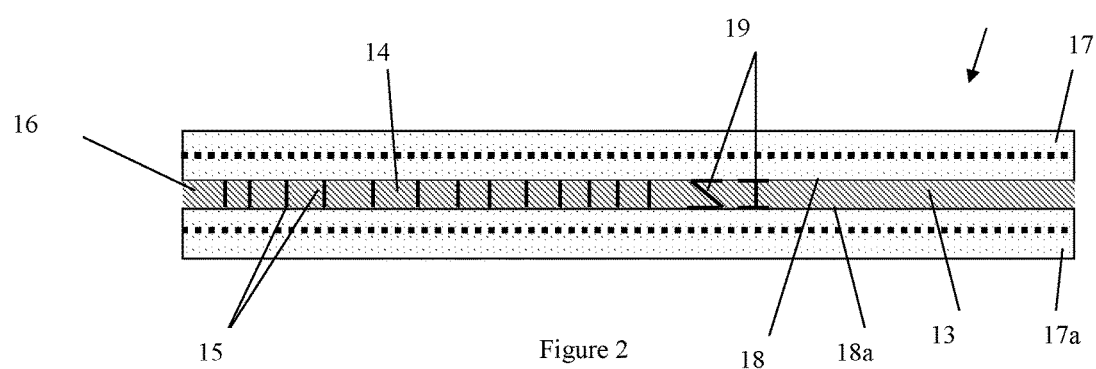

An embodiment of the invention will now be described by way of example only and with reference to the accompanying drawings of which:

FIG. 1 shows a side view of two fibre reinforced composite structures to be bonded together FIG. 2 shows a side view of two fibre reinforced polymer composites bonded with pins Turning to FIG. 1, provides a bonded fibre reinforced composite structure 1, the first composite 7 may be a wing portion and the second composite 7a may be a fuselage portion of a plane. The first composite 7 comprises reinforcement fibre plys 2, which are encapsulated in a resin matrix 3, said resin matrix comprises further filler materials 4. The second composite 7a comprises reinforcement fibre plys 2a, which are encapsulated in a resin matrix 3a, which said resin matrix comprises further filler materials 4a. The first composite 7 has a mating surface 8, which is to be joined to the second composite 7a, via mating surface 8a. The surfaces 8, 8a are bought into close proximity, at least one intermediary layer 5 is located between surfaces 8 and 8a, and the remaining void filled with a conductive adhesive 6. Preferably the intermediary layer 5, has a thickness which corresponds to the optimal bond line separation, namely the gap between surface 8 and 8a.

Turning to FIG. 2 there is provided a bonded structure 11, with a first composite 17 and a second composite 17a, with respective mating surfaces 18 and 18a. The surfaces 18, 18a are bought together and are firmly abutted to the pins 15 or Z- or I-pins 19. The pins may be provided in a carrier, not show. The pins will have a length which corresponds to the optimal bonding gap between surfaces 18 and 18a. The resultant void is filled with a conductive adhesive 16, said adhesive comprising a binder 13 and high aspect ratio metal coated carbon nanotubes 14.

Experiment 1 Curable Monomer Adduct Powder

Liquid epoxy resin (e.g. Huntsman LY564) (74 g) was mixed with 2 g carbon nanotubes (Nanocyl NC7000). The CNTs were dispersed in the resin to separate out the agglomerations. This dispersion was performed by a triple roller mill to subject the solution to high shear forces, however ultrasonic mixing methods are equally applicable.

The epoxy-CNT(2.7 pph) solution was combined with a stoichiometric quantity of liquid curing agent 35 g (Huntsman Aradur 2954) and mixed. The solution was poured into a mould and left to cure at room temperature for 24 hours. The mould housing was temperature controlled to prevent exothermic reactions accelerating the rate of cure, beyond the partially cured adduct.

The powdered adduct had advanced the cure sufficiently for the epoxy to be solid without achieving complete 3D network formation. The solid adduct was crushed to a coarse aggregate and milled to a fine powder at cryogenic temperatures. The cryomill ensured that the milling process did not generate heat, which may have reactivated the curing process.

Experiment 2—Formation of a FRP

The powdered adduct from Experiment 1 was then dispersed evenly over the surface of 6 plys of woven 300 g·m$^{-2}$ carbon fabric in a stacked laminate. The quantity applied to each ply was controlled to ensure the correct fibre volume fraction of the completed composite laminate that is for a 55% volume fraction, approximately 170 g·m$^{-2}$ of powdered resin evenly distributed over each ply.

The laminate was placed under vacuum and cured at 120° C. under high pressure (6 bar) in an autoclave, for 30 minutes, with a heating ramp rate of 10° C.min$^{-1}$. During cure the curable monomer adduct powder reverted to a mobile state so that good wetting of the carbon fabric was achieved.

Experiment 3—Interlaminar Toughness

Fracture resistance to interlaminar crack propagation is a key measure of toughness and damage tolerance for composite laminates. A 5 wt % formulation of NC7000 CNT in LY564/ARADUR2954 was applied to a carbon fibre laminate as in Experiment 2. The nano-augmented laminates were compared against control laminates using the same unmodified epoxy resin. Interlaminar fracture energies were measured using Double Cantilever Beam tests (ASTM D5528). The mean propagation fracture energy of the nano-augmented laminate increased from 329 J/m$^2$ to 486 J/m$^2$ (47%), reflecting the enhanced energy dissipation caused by the presence of CNT at a concentration level not previously achievable with conventional liquid techniques of incorporating CNT. The improved fracture resistance is accompanied by concomitant enhancements in glass transition temperature and elastic modulus. The inclusion of at least 5% wt of a carbon nanoscale particular filler in the matrix, allow the matrix to become electrically conducting. This enables the development of multi-functional structural laminates, such as, for example integrated protection against electromagnetic hazards.

The invention claimed is:

1. A method of bonding a first fibre reinforced polymer composite surface and a second fibre reinforced polymer composite surface, the method comprising:
   providing a conductive intermediary structure between said first and second surfaces, wherein the first and second surfaces are separated by a bonding gap distance, the conductive intermediary structure having a thickness that is substantially the same as the bonding gap distance between the first and second surfaces, the at least one conductive intermediary structure including a regular array of a plurality of pins, Z-pins, or I-pins, spanning a bond line of the first and second fibre reinforced polymer composite surfaces;
   filling a void between said first and second surfaces and enveloping said conductive intermediary structure with a conductive adhesive, the conductive adhesive including a curable binder and a high aspect ratio nanoscale carbon particulate filler present in the range of from 0.1 to 40% wt, wherein the particulate filler includes a conductive coating, and wherein the conductive coating is a metal; and
   curing the conductive adhesive to form a bonded first and second surface.

2. The method according to claim 1, wherein the particulate filler is present in the range of from 1 to 15% wt.

3. The method according to claim 1, wherein the conductive intermediary structure is selected from the group consisting of a plurality of metallic spheres, a plurality of conductive pins, a metallic mesh, a conductive fibre ply, and a carbon nanotube film.

4. A lightning strike resilient bonded composite structure comprising:
   a first fibre reinforced polymer composite surface;
   a second fibre reinforced polymer composite surface, wherein the first and second surfaces are separated by a bonding gap distance;
   at least one conductive intermediary structure between the first and second surfaces, the at least one conductive intermediary structure having a thickness that is substantially the same as the bonding gap distance between the first and second surfaces, the at least one conductive intermediary structure including a regular array of a plurality of pins, Z-pins, or I-pins, spanning a bond line of the first and second fibre reinforced polymer composite surfaces; and
   a cured conductive adhesive filling a void between the first and second surfaces and enveloping the at least one conductive intermediary structure, the conductive adhesive including a curable binder and a high aspect ratio nanoscale carbon particulate filler present in the range of from 0.1 to 40% wt, wherein the particulate filler includes a conductive coating, and wherein the conductive coating is a metal.

5. A vehicle, vessel or craft, comprising at least two structural components, which are affixed by the method according to claim 1.

6. The structure according to claim 4, wherein the particulate filler is present in the range of from 1 to 15% wt.

7. The structure according to claim 4, wherein the cured conductive adhesive includes at least one curing agent.

8. The structure according to claim 4, wherein the conductive intermediary structure is selected from the group consisting of a plurality of metallic spheres, a plurality of conductive pins, a metallic mesh, a conductive fibre ply, and a carbon nanotube film.

9. A vehicle, vessel or craft, comprising the structure according to claim 4.

10. The structure according to claim 4, wherein the conductive intermediary structure includes a conductive fibre ply in which carbon nanotubes are dispersed over a fibre ply.

11. The structure according to claim 4, wherein the first and second surfaces each abut the regular array of the intermediary structure.

12. The structure according to claim 4, wherein the regular array of the intermediate structure is in an integrated carrier.

\* \* \* \* \*